J. M. HALL.
BATTERY CONNECTOR.
APPLICATION FILED APR. 8, 1911.
1,041,464.
Patented Oct. 15, 1912.
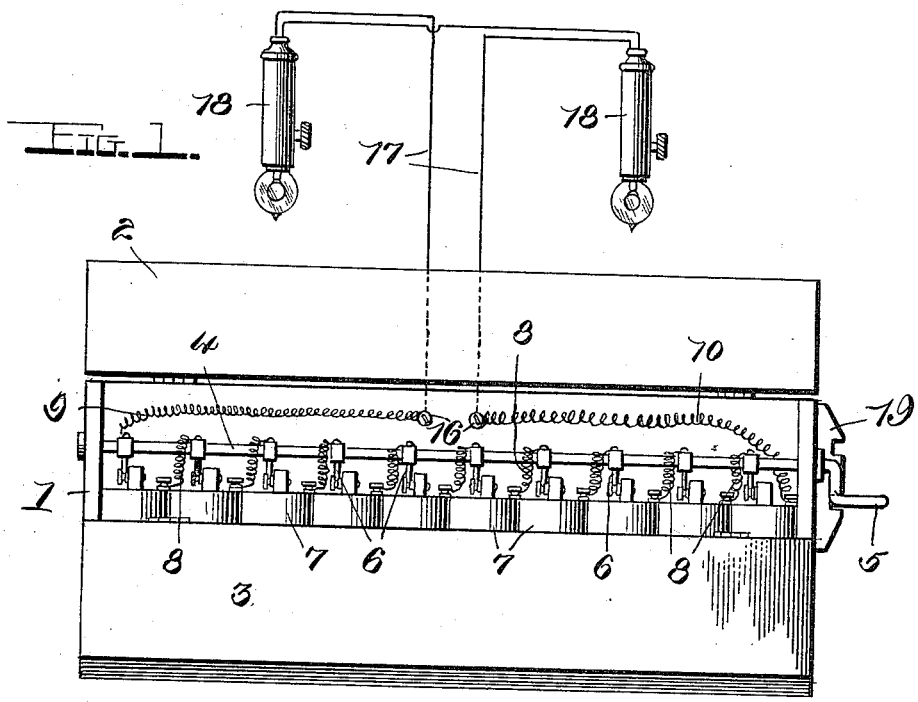
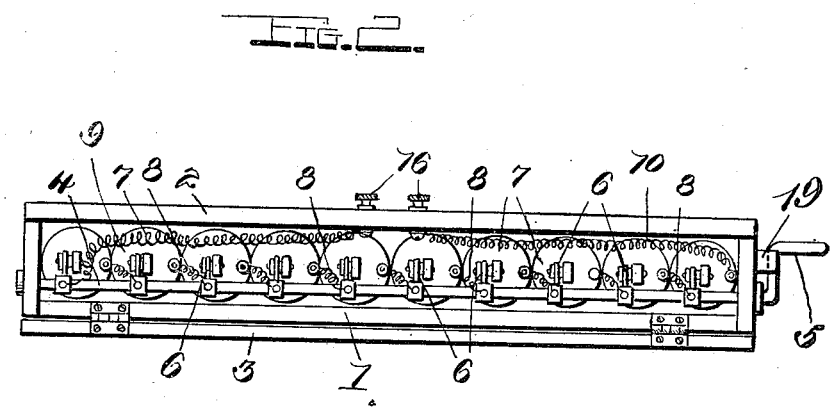
Witnesses
Chas. L. Griestaver.
L. G. Ellis.
Inventor
J. M. Hall.
By Watson E. Coleman.
Attorney

UNITED STATES PATENT OFFICE.

JAMES MONROE HALL, OF SULPHUR SPRINGS, TEXAS.

BATTERY-CONNECTOR.

1,041,464.　　　　Specification of Letters Patent.　　Patented Oct. 15, 1912.

Application filed April 8, 1911. Serial No. 619,835.

*To all whom it may concern:*

Be it known that I, JAMES M. HALL, a citizen of the United States, residing at Sulphur Springs, in the county of Hopkins and State of Texas, have invented certain new and useful Improvements in Battery-Connectors, of which the following is a specification, reference being had to the accompanying drawings.

My invention relates to new and useful improvements in means for generating power for use in connection with electric lighting and the like and more particularly to a battery connector therefor, and my object is to provide a device which may be readily and cheaply installed in all homes for use in any connection whatsoever, whereby the use of the city power plant may be eliminated.

A further object of the invention resides in providing a manually operated rod adapted to form a connection between a series of batteries.

A still further object resides in providing a receptacle for carrying the batteries and in which said rod is rotatably mounted.

With these and numerous other objects in view, my invention consists in the novel features of construction, combination and arrangement of parts as will be hereinafter referred to and more particularly pointed out in the specification and claims.

In the accompanying drawing forming a part of this application, Figure 1 is a front elevation of the receptacle carrying the series of batteries and showing the connector applied to use, and, Fig. 2 is a top plan view thereof.

In carrying out my invention, I shall refer to the drawing in which similar reference characters designate corresponding parts throughout the several views and in which 1 indicates a receptacle of any preferred size and shape, I having shown the same rectangular, with the hinged top 2 and a hinged front wall 3, and extending through said receptacle and rotatably mounted in the end walls thereof is a metal rod 4. One end of said rod extends beyond one of the end walls of the receptacle and is bent to form a crank or handle member 5 said rod being provided throughout its length with a plurality of metallic fingers 6 which are insulated therefrom and extend at substantially right angles to the general trend thereof, the purpose of which will be hereinafter and more particularly described. This receptacle is adapted to receive a plurality of batteries, I having shown the dry cells 7 having the customary pole pieces extending vertically from the upper portion thereof, and said batteries are adapted to be positioned therein so that the carbon connection of each battery is immediately below a laterally extending finger of the rod 4. The wires 8 are then applied so as to connect the zinc of one battery with the fingers 6 extending over the carbon of the successive battery so that when the rod is turned to allow the fingers thereon to engage the carbon connections of the batteries, opposite poles of the batteries will be connected. The end cells, however, will each have a pole unconnected with the rod, to which poles are respectively connected the wires 9 and 10 leading to the contact posts 16 entered through the rear wall of said receptacle, and connected to said contact posts from the outer side, are the line wires 17, which may be connected so as to be used for any desired purpose. I, however, have shown the same connected to electric light sockets 18, for which purpose this device is more particularly adapted.

Although I have shown in the drawing a series of dry cells, it will be well understood that either form of wet or dry battery system may be used and also as many batteries and a corresponding number of fingers on the rod may be used, as desired, since this is entirely within the scope of the mechanic.

From the foregoing, it will be seen that when it is desired to generate a current through the series of batteries after the same have been connected in the manner hereabove described, it is only necessary to turn the crank 5 of the rod 4 so that the fingers 6 thereon contact, respectively, with the carbon connections of the batteries. The current will then be generated to pass through the wires 9 and 10, which current is then carried through the line wires and, as stated, is adapted for use in any connection, but particularly for lighting purposes.

This device may be readily installed in any home and thereby eliminate the necessity of using the more expensive electricity obtained from the city plant.

In order to provide means for retaining the fingers in their effective or ineffective positions, a keeper or the like 19 is mounted on one end of the receptacle and has notches therein to receive the crank or handle member 5.

What I claim is:—

1. A device of the character described, comprising a series of batteries having pairs of pole pieces thereon, a rod disposed over said batteries having laterally extending fingers thereon, said fingers being disposed over the same pole of each battery, and wires connecting the opposite poles to said fingers.

2. In a device of the character described, the combination with a series of batteries having pairs of pole pieces thereon; of a rod rotatably mounted above said batteries and provided with laterally extending fingers, said fingers being disposed, respectively, over the same poles of the batteries and wires connecting the remaining pole of each battery to the finger disposed over the successive battery.

3. In a device of the character described, the combination with a housing and a series of batteries mounted therein having pole pieces thereon; of a rod rotatably mounted in the ends of said receptacle and disposed above said batteries, said rod being provided with laterally extending fingers equal in number to the number of batteries used and said fingers being disposed in alinement with the same pole of said batteries, wires connecting the remaining pole of each battery to the finger disposed over the successive battery, and means to rotate said rod and dispose the fingers in engagement with the pole pieces of the batteries over which they extend.

4. A device of the class described, comprising a housing and a series of batteries arranged in alinement therein; of a rod rotatably mounted in said housing and disposed over said batteries, said rod being provided with a plurality of laterally extending fingers disposed over the same pole of each battery, wires connecting the opposite poles to said fingers, a handle member formed on one end of said rod, and means to retain said rod in its adjusted positions.

5. A device of the class described, comprising a housing, and a series of batteries alined in said housing; of a rod rotatably mounted in said housing and disposed above said batteries, said rod being provided with a plurality of laterally extending fingers disposed, respectively, over the same poles of the batteries, wires connecting the opposite poles to said fingers, a handle member formed on one end of said rod and disposed beyond the end of said housing, and a keeper mounted on one end of said housing adapted to engage said handle member and retain the rod in its adjusted positions.

In testimony whereof I hereunto affix my signature in the presence of two witnesses.

JAMES MONROE HALL.

Witnesses:
E. T. GAFFORD,
I. T. RIGGS.

---

Copies of this patent may be obtained for five cents each, by addressing the "Commissioner of Patents, Washington, D. C."